UNITED STATES PATENT OFFICE.

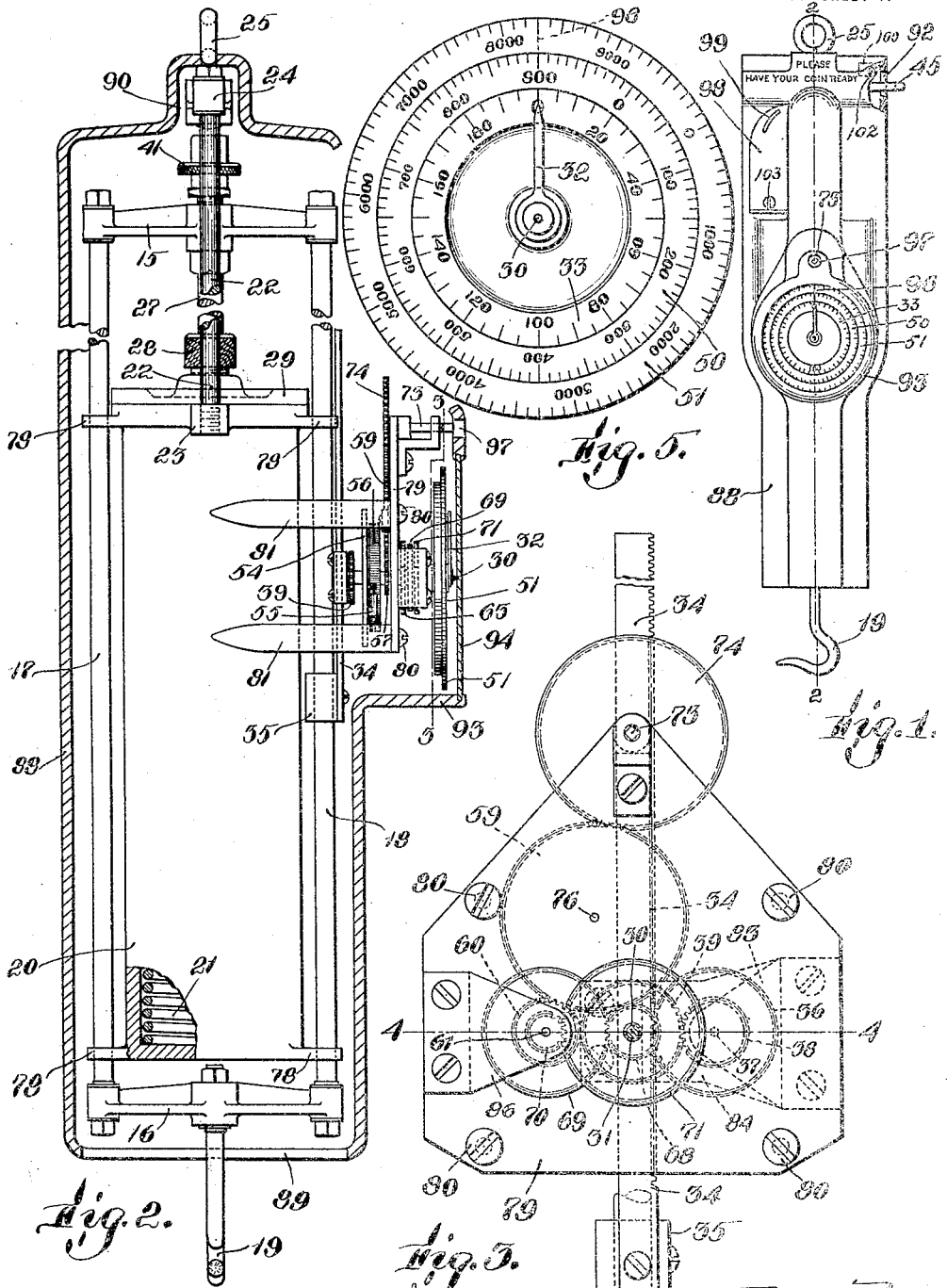

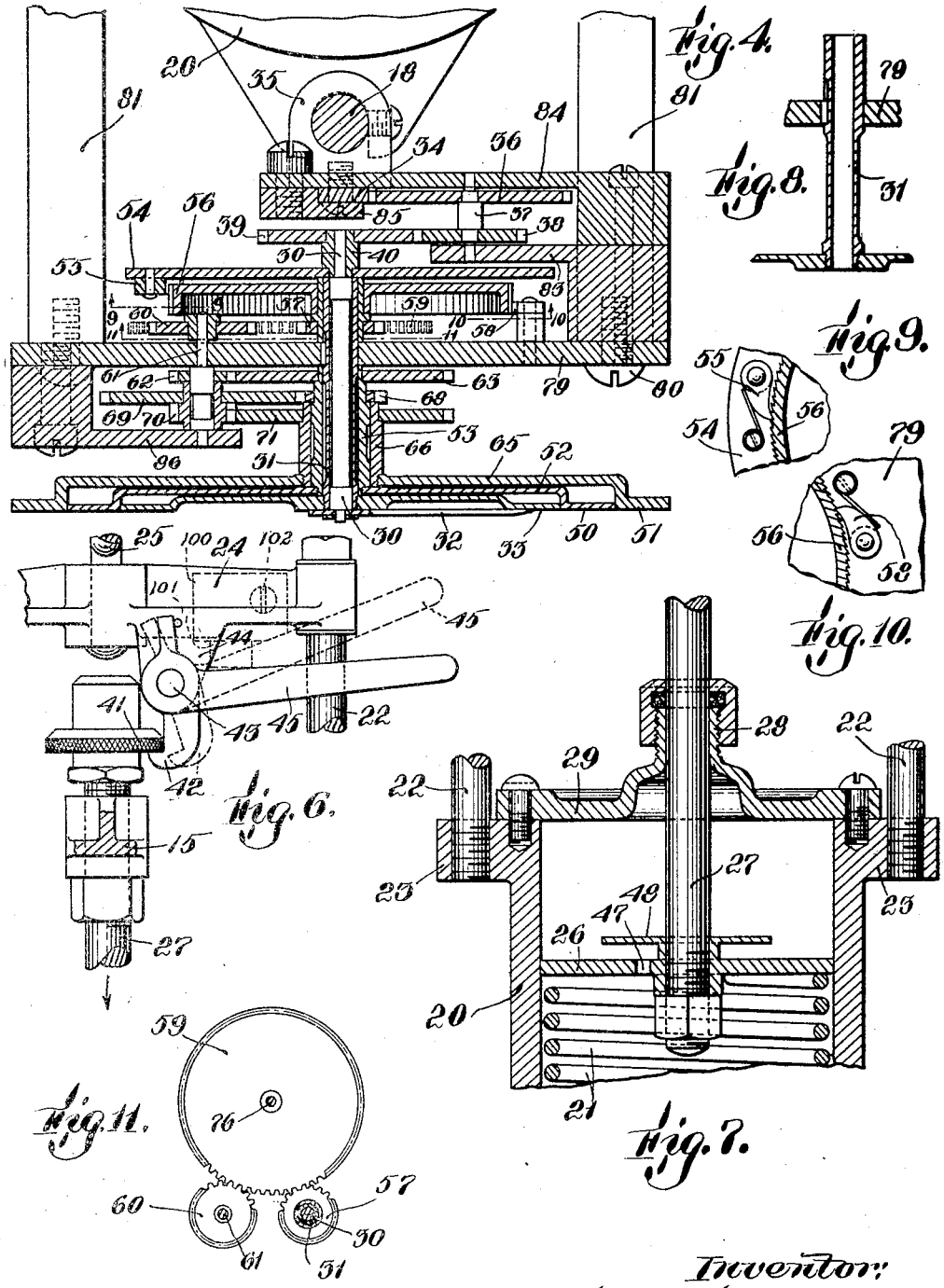

HOSEA HATHAWAY, OF BROOKLINE, MASSACHUSETTS.

REGISTERING WEIGHING-SCALE.

1,336,351.  Specification of Letters Patent.  Patented Apr. 6, 1920.

Application filed March 26, 1919. Serial No. 285,168.

*To all whom it may concern:*

Be it known that I, HOSEA HATHAWAY, a citizen of the United States, residing at Brookline, in the county of Norfolk and State of Massachusetts, have invented new and useful Improvements in Registering Weighing-Scales, of which the following is a specification.

This invention relates to a weighing scale which includes a vertically movable load-carrying means, a supporting structure or holder adapted to be engaged with an overhead or other support, a yielding resistance means supported by the supporting structure and yieldingly supporting the load-carrying means in an initial position, a registering mechanism operated by the descent of the load-carrying frame to register each separate weighing and the aggregate of a plurality of weighings.

The invention is embodied in the improvements hereinafter described and claimed.

Of the accompanying drawings forming a part of this specification—

Figure 1 is a front elevation of a weighing scale embodying the invention, the principal parts of the scale mechanism being covered by a casing.

Fig. 2 shows the casing in section on the line 2—2 of Fig. 1, a part of the casing being broken away, and the scale mechanism being shown chiefly in elevation.

Fig. 3 is a section on line 3—3 of Fig. 2, and an elevation of the mechanism at the left of said line.

Fig. 4 is a section on line 4—4 of Fig. 3, the casing and portions of the supporting structure and load-carrying frame being omitted.

Fig. 5 is an enlargement of a portion of Fig. 1.

Fig. 6 is a fragmentary elevation showing the detent members hereinafter referred to.

Fig. 7 is a fragmentary sectional view, showing a portion of the cylinder forming a part of the supporting structure, the piston hereinafter referred to attached to the load-carrying frame, and a portion of the spring which supports the load-carrying frame.

Fig. 8 is an enlargement of a portion of Fig. 4.

Fig. 9 is a section on line 9—9 of Fig. 4.

Fig. 10 is a section on line 10—10 of Fig. 4.

Fig. 11 is a section on line 11—11 of Fig. 4.

The same reference characters indicate the same parts in all of the figures.

The load-carrying frame of my improved scale includes upper and lower cross heads 15 and 16 and longitudinal parallel rods 17 and 18 fixed at their opposite ends to the cross heads. The lower crosshead 16 is provided with load-engaging means, here shown as a hook 19, which may be formed to engage ice tongs carrying a block of ice, although it is obvious that said means may be otherwise formed.

While the supporting structure may be of any suitable form and construction, I prefer, for reasons which will hereinafter appear, to embody it in a cylinder 20, the lower end of which forms an abutment for a helical spring 21, a pair of upright rods 22 fixed to ears 23 (Fig. 7), on the upper end of the cylinder, and a cross head 24 (Figs. 2 and 6), fixed to and connecting the upper ends of the rods 22. The cross head 24 is provided with means, such as an eye bolt 25, for engaging an overhead support, from which the entire scale structure is or may be suspended.

The weight-carrying frame is yieldingly supported in a raised position by the spring 21, said frame being provided with a member seated on the upper end of the spring. Said member is preferably a piston 26 (Fig. 7), attached to a vertical rod 27 and having a sliding fit in the cylinder 20, the rod 27 being fixed to the upper cross head 15 and movable in a stuffing-box 28 on the upper head 29 of the cylinder.

The registering mechanism of my improved scale includes a center arbor 30, journaled in a bearing 31 (Figs. 4 and 8), forming a part of the housing hereinafter described, a pointer 32 attached to said arbor, and a fixed dial 33 concentric with the center arbor and inscribed to coöperate with the pointer in registering separate weighings, the fixed dial as here shown being adapted to indicate weights not exceeding two hundred pounds.

The registering mechanism also includes torque-transmitting connections between the center arbor 30 and the load-carrying frame, whereby, when the frame is depressed by a load, the center arbor is rotated and the pointer is moved forward over the dial. I preferably embody said connections on a vertical rack 34 attached to a fixed collar 35 on the frame rod 18 and movable with the frame, and a gear train, the members of which include a gear 36 (Fig. 4), meshing with the rack, an arbor 37 fixed to said gear and journaled in bearings in the housing above referred to, a gear 38 fixed to said arbor, and a gear 39 having a hub 40, fixed to the center arbor 30, the gear 39 meshing with the gear 38.

When the fixed dial 33 is inscribed as shown, the gear 36 has fifty teeth, the gear 38 has twenty-six teeth, and the gear 39 has forty teeth.

When the load-carrying frame is depressed by a load, the described connections impart a forward rotation to the center arbor 30, so that the pointer is moved forward over the fixed dial 33. When the load is removed, the spring 21 raises the load-carrying frame, and causes the said connections to rotate the center arbor backward and return the pointer to zero.

I provide means for locking the load-carrying frame to the supporting structure when the frame is fully raised, said means being preferably embodied in a detent member 41, (Fig. 6), formed as a collar or flange fixed to the piston rod 27, and a manually movable detent member 42 pivoted at 43 to an ear 44 on the cross head 24 of the supporting structure, and formed as a hook adapted to engage the member 41, the member 42 being provided with a lever 45, whereby it may be displaced as shown by dotted lines in Fig. 6. The cylinder 20, forming a part of the supporting structure, also forms a part of a governor adapted to retard the descent of the weight-carrying frame and bring the frame and the pointer 32 to rest at the end of the downward movement of the frame without jarring or vibrating the pointer.

The cylinder contains a body of oil or other suitable liquid, which fills the cylinder up to the piston 26 when the latter is raised. The piston is perforated to form an orifice or orifices 47 (Fig. 7), through which the liquid flows from the lower to the upper side of the piston when the latter is descending. The piston is provided with a baffle-plate 48 which overhangs the orifice 47, and laterally deflects the liquid flowing through said orifice, thus adding to the retarding effect. The hub of the piston 26 which is formed to receive the lower end of the rod 27, is extended above the piston as shown by Fig. 7, and the baffle plate 48 is formed on the extension of the hub, and is in close proximity to the upper side of the piston, the piston and baffle plate being attachable as a single part to the piston rod.

To register the aggregate amount of a series of separate weighings, I provide one or more rotatable annular dials concentric with the fixed dial 33, and rotatable by additional members of the above-described gear train, two annular dials 50 and 51 being here shown. I will first describe the dial 50 and the members of the gear train employed to rotate the same.

The annular dial 50 is offset from a disk 52. Said disk is fixed to one end of a sleeve 53 (Fig. 4), which is mounted to rotate on the tubular bearing 31. Torque is transmitted from the center arbor 30 to the sleeve 53 and annular dial 50, to rotate the latter in a forward direction only through connections including members constituting an extension of said gear train, means being provided for preventing backward rotation of the annular dial.

Referring to Figs. 4 and 9, 54 represents a plate or disk fixed to the hub 40 of the gear 39, and provided with a pawl 55. 56 represents a ratchet wheel engaged by the pawl 55. A gear 57 is fixed to the hub of the ratchet wheel, said gear and ratchet wheel being mounted to rotate on the tubular bearing 31 in which the center arbor is journaled. A stop pawl 58 pivoted to a fixed support, engages the teeth of the ratchet wheel 56, and prevents backward rotation of the latter. The gear 57 meshes with an intermediate gear 59, supported by an arbor 76 and meshing with a gear 60, which is fixed to one end of an arbor 61. To the opposite end of said arbor is fixed a gear 62 meshing with a gear 63 fixed to the sleeve 53. The gears 57, 59, 60, and 63 constitute an extension of the gear train formed by the gears 36, 38 and 39.

The annular dial 50, as here shown, is inscribed to indicate an aggregate weight not exceeding one thousand pounds, and when the dial is so inscribed, the gear 57 has twenty teeth, the intermediate gear 59 has seventy-six teeth, the gear 60 has twenty-five teeth, the gear 62 has fourteen teeth, and the gear 63 has fifty-six teeth.

The described connections are organized to rotate the annular dial forward at a rate causing it to register the aggregate of separate weighings up to one thousand pounds, backward rotation of the annular dial being prevented by the stop pawl 58.

The annular dial 50 may be called the intermediate dial, it being interposed between the fixed dial 33 and the annular dial 51 which may be called the outer dial. Said outer dial is offset from a disk 65 which is fixed to one end of an outer sleeve 66 (Fig. 4). Said sleeve is mounted to rotate on the sleeve 53 which I call the inner sleeve.

Torque is transmitted to the outer sleeve 66 and outer dial 51 through the gear train members next described.

To the inner sleeve 53 is fixed a gear 68 meshing with a gear 69, which is mounted to rotate on the arbor 61. A gear 70, fixed to the gear 69, meshes with a gear 71, which is fixed to the outer sleeve 66. The gear 68 has twenty teeth, the gear 69 has fifty teeth, the gear 70 has fourteen teeth, and the gear 71 has fifty teeth.

The described connections are organized to rotate the outer dial forward at a rate causing it to register the aggregate of weighings indicated by the inner dial up to ten thousand pounds, backward rotation of the outer dial being prevented by the stop pawl 58. I have provided means whereby each of the annular dials may be manually rotated forward to set it at zero, said means being embodied in an arbor 73 journaled in a fixed bearing, and squared at its outer end to engage a key, a gear 74 fixed to said arbor, and the intermediate gear 59 above mentioned, said intermediate gear meshing with one of the gears, and preferably the gear 60 included in that part of the train which communicates torque to the annular dials.

The rods 17 of the weight-supporting frame are movable in guides 78 (Fig. 2), which are preferably slotted ears on the cylinder 20.

The housing above mentioned, which has the bearings for the several arbors above described, includes a plate 79 attached by screws 80 to posts 81 forming parts of the supporting structure, and preferably formed on or attached rigidly to the cylinder 20, and projecting laterally therefrom, as shown by Fig. 2. The tubular bearing 31 in which the center arbor is journaled, passes through and is fixed to the plate 79, as shown by Fig. 8. Brackets 83 and 84, secured to the plate 79, have bearings for the arbor 37, the bracket 84 being provided with a guide 85 for the rack 34. A bracket 86 attached to the plate 79, has one of the bearings for the arbor 61. The inner end portion of the tubular bearing 31 supports the pawl-carrying plate 54, the ratchet wheel 56, and the gear 57. The outer end portion of said tubular bearing supports the sleeves 53 and 66 and the gears 63, 68 and 71. The plate 79 supports the stop pawl 58.

A case 88 incloses the supporting structure and the weight-carrying frame, the latter, when raised, being entirely within the case with the exception of the hook 19, which projects below the case. An opening is provided at 89 in the lower end of the case, through which the lower cross head 16 passes when the frame is depressed. The case is provided at its upper end with an opening 90 (Fig. 2), from which the eyebolt 25 projects, and with a slot 92 (Fig. 1), in which the detent lever 45 is movable.

The case is provided at one side with an enlargement 93, which receives the housing above described, and the dials and other mechanism supported by the housing. Said enlargement has a circular sight opening having a circular cover 94 of glass, through which the dials are visible. The cover 94 is provided with a mark at 96 (Fig. 1), arranged to register with the zero marks on the annular dials when they are in their initial positions.

The case enlargement 93 is provided with an orifice 97 (Fig. 1), permitting the application of a key to the dials-setting arbor 73.

The case may be provided with a coin receptacle 98 (Fig. 1), having a coin-receiving slot 99, and enabling a customer to deposit coin in payment for ice or other commodity weighed by the scale in the presence of the vender. The case rests loosely on parts of the supporting structure, and may be made in sections detachably connected, the case being removable when the sections are detached from each other.

It will be seen that the scale may be suspended in the vicinity of a refrigerator, and used for weighing ice, each separate weighing being registered by the pointer and the fixed dial, and the aggregate result of a number of weighings being registered by the coöperation of the annular dial or dials with the mark 96.

The detent member 42 may be locked in its operative position to prevent the operation of the scale by an unauthorized person.

To this end I apply to the casing 88 a lock of any suitable construction. The casing 100 of said lock is shown by dotted lines in Figs. 1 and 6, and the lock-bolt 101 is shown by dotted lines in Fig. 6. The lock has a key hole 102 opening on the exterior of the casing. When the bolt 101 is projected, it bears on the lever 45 and holds the same in the full line position shown by Fig. 6. When the bolt is retracted, the lever is movable to release the load-carrying frame. To permit the removal of coins, the coin-receptacle 98 may have a removable portion held by a lock, the key hole of which is shown at 103, (Fig. 1).

It will be seen that the above-described load-carrying frame including the cross heads 15 and 16, the rods 17 and 18, and the load-engaging hook 19, constitutes an embodiment of load-carrying means movable from an initial position by a load to be weighed, and that the spring 21 carried by the described supporting structure, constitutes a suitable embodiment of yielding resistance means for normally maintaining the load carrying means in an initial position, and the pointer at zero, the load carrying means being movable by a load from said position, and acting through the described torque-transmitting connections, including the rack 34 engaged with said load-carrying means, to operate the registering dials.

A registering scale embodying the load-carrying means, the supporting means, and the yielding resistance means here shown, is particularly adapted for use in weighing and registering the weight of articles such as cakes of ice. It is obvious, however, that the load-carrying means, the supporting means, and the yielding resistance means, may be otherwise embodied.

I claim:

1. A weighing scale comprising load-carrying means movable by a load applied thereto, a supporting structure for said means, yielding resistance means normally supporting the load-carrying means in an initial position, a pointer-carrying arbor journaled in a fixed bearing on the supporting structure, a fixed dial concentric with said arbor, a rotatable annular dial concentric with the fixed dial, and torque-transmitting connections between the load-carrying means, the arbor, and the annular dial, operable by the depression of the load-carrying means and including means for revolving the pointer over the fixed dial, and for rotating the annular dial about the fixed dial.

2. A weighing scale comprising a load-carrying means movable by a load applied thereto, a supporting structure for said means, yielding resistance means normally supporting the load-carrying means in an initial position, a pointer-carrying arbor journaled in a fixed bearing on the supporting structure, a fixed dial concentric with said arbor, a rotatable annular dial concentric with the fixed dial, a gear train mounted on the supporting structure and including a member fixed to said arbor, torque-transmitting connections between the load-carrying frame and the said gear train, and an extension of said gear train including a member fixed to the annular dial.

3. A weighing scale comprising a vertically movable load-carrying frame provided with a piston rod, a supporting structure having means for guiding said frame, and including a cylinder having a stuffing-box at its upper end in which said rod is movable, a spring supported by the lower end of the cylinder and yieldingly supporting the frame, a pointer-carrying arbor journaled in a fixed bearing on the supporting structure, a fixed dial concentric with said arbor, torque-transmitting connections between the frame and arbor, operable by the depression of the frame, a body of liquid in said cylinder, and a piston having a hub fixed to the lower end of the piston rod, and having a liquid passage, said piston being movable in the cylinder, and its hub being extended above the piston and provided with a baffle plate in close proximity to the upper side of the piston, and overhanging the liquid passage therein, said piston and baffle plate being attachable as a single part to the piston rod, the cylinder, piston and baffle plate constituting elements of a governor whereby the movements of the arbor and its pointer are arrested without vibration.

4. A weighing scale comprising a vertically movable load-carrying frame, provided with a central rod having a detent member, a supporting structure on which said frame is movable, said structure including a cross head above the rod and its detent member, a movable detent member pivoted to said cross head and provided with a lever whereby it may be manually moved into and out of engagement with the detent member on said rod, yielding resistance means supported by said structure and yieldingly supporting the frame, a pointer-carrying arbor journaled in a fixed bearing on the supporting structure, and torque-transmitting connections between the frame and arbor operable by the depression of the frame, the said detent members being arranged to hold the frame at the upper extreme of its movement.

5. A weighing scale comprising a vertically movable load-carrying frame, provided with a central rod having a detent member, a supporting structure on which said frame is movable, said structure including a cross head above the rod and its detent member, a movable detent member pivoted to said cross head and provided with a lever whereby it may be manually moved into and out of engagement with the detent member on said rod, a lock on said cross head adapted to engage said lever and lock said movable member in its operative position, a yielding resistance means supported by said structure and yieldingly supporting the frame, a pointer-carrying arbor journaled in a fixed bearing on the supporting structure, and torque-transmitting connections between the frame and arbor operable by the depression of the frame, the said detent members being arranged to hold the frame at the upper extreme of its movement.

6. A weighing scale comprising a load-carrying means movable by a load applied thereto, a supporting structure for said means, yielding resistance means normally supporting the load-carrying means in an initial position, a pointer-carrying arbor journaled in a fixed bearing on the supporting structure, a fixed central dial concentric with said arbor, a rotatable annular dial concentric with the fixed dial, and torque-transmitting connections between the load-carrying means and said arbor and annular dial, operable by the depression of the load-carrying means to cause the pointer to register separate weighings on the fixed dial up to a predetermined limit, and to cause the annular dial to register the result of a series of separate weighings, said connections including a rack fixed to the load-carrying means, and a gear train carried by the supporting structure and having torque-transmitting members connecting the rack with the arbor, and torque-transmitting members connecting the arbor with the annular dial.

7. A registering weighing scale substantionally as specified by claim 6, the train members connecting the rack with the arbor being rotatable backward to permit the return of the pointer to zero, after each separate weighing, automatic means being provided for preventing backward rotation of the other train members and of the annular dial.

8. A registering weighing scale substantially as specified by claim 6, the train members connecting the rack with the arbor being rotatable backward to permit the return of the pointer to zero, after each separate weighing, automatic means being provided for preventing backward rotation of the other train members and of the annular dial, and manually operable means being provided for rotating the annular dial forward to set it at zero.

9. In a registering weighing scale, in combination, load-carrying means movable by a load applied thereto, a supporting structure for said means, yielding resistance means normally supporting the load-carrying means in an initial position, said resistance means being supported by said structure, a housing attached to the supporting structure and provided with fixed bearings, one of which is tubular and constitutes an internal and an external bearing, and registering mechanism comprising a rack attached to said load-carrying means, a pointer-carrying arbor journaled in said tubular bearing, a central dial fixed to said tubular bearing and concentric with said arbor, a sleeve journaled on said tubular bearing, a rotatable annular dial fixed to said sleeve and concentric with the fixed dial, and a gear train supported by the housing bearings and including torque-transmitting members connecting the rack with the arbor, and torque-transmitting members connecting the arbor with said sleeve.

10. In a registering weighing scale, in combination, load-carrying means movable by a load applied thereto, a supporting structure for said means, yielding resistance means supported by said structure and yieldingly supporting said load carrying means, a housing attached to the supporting structure and provided with fixed bearings, one of which is tubular and constitutes an internal and an external bearing, and registering mechanism comprising a rack attached to said load-carrying means, a pointer-carrying arbor journaled in said tubular bearing, a central dial fixed to said tubular bearing and concentric with said arbor, an inner sleeve journaled on said tubular bearing, a rotatable annular intermediate dial fixed to said sleeve and concentric with the fixed dial, an outer sleeve journaled on said inner sleeve, a rotatable annular outer dial fixed to the outer sleeve and concentric with the intermediate and fixed dials, and a gear train supported by the housing bearings and including torque-transmitting members connecting the rack with the arbor, torque-transmitting members connecting the arbor with the inner sleeve, and torque-transmitting members connecting the inner sleeve with the outer sleeve.

11. In a registering weighing scale, in combination, load-carrying means movable by a load applied thereto, a supporting structure for said means, yielding resistance means supported by said structure and yieldingly supporting said load carrying means, a housing attached to the supporting structure and provided with fixed bearings, one of which is tubular and constitutes an internal and an external bearing, and registering mechanism comprisng a rack attached to said load-carrying means, a pointer-carrying arbor journaled in said tubular bearing, a central dial fixed to said tubular bearing and concentric with said arbor, a sleeve journaled on said tubular bearing, a rotatable annular dial fixed to said sleeve and concentric with the fixed dial, a gear train supported by the housing bearings and including torque-transmitting members connecting the rack with the arbor, and torque-transmitting members connecting the arbor with said sleeve, the torque-transmitting members connecting the rack with the arbor being rotatable backward as well as forward, and means for preventing backward rotation of the other torque-transmitting members, said means including a plate fixed to the arbor and provided with a pawl, a ratchet wheel concentric with the arbor and fixed to one of the torque-transmitting members connecting the arbor with the sleeve, said plate, pawl, and ratchet wheel being adapted to impart forward rotation to the annular dial, and a stop pawl pivoted to said housing and engaging the ratchet wheel to permit backward rotation of the annular dial.

12. A registering weighing scale embodying the combination substantially as specified by claim 9, said combination incuding also means for preventing backward rotation of the annular dial, and means for setting the annular dial to zero, said means comprising a key-operated arbor journaled in bearings on the housing, and a gear fixed to said arbor and meshing with one of the torque-transmitting members connecting the arbor with the sleeve.

13. A weighing scale comprising a vertically movable load-carrying frame, having a load-engaging device at its lower end, a supporting structure having a device at its upper end for engaging an overhead support, and means for guiding said frame, a spring supported by said structure and yieldingly supporting said frame, a pointer-carrying arbor journaled in a fixed bearing on the supporting structure, a fixed dial concentric with said arbor, torque-transmitting connections between the load-carrying frame and the arbor, operable by the depression of the frame, and an inclosing case supported by the supporting structure, and provided at its upper end with an opening from which said support-engaging device projects, an opening at its lower end from which said load-engaging device projects, and a sight opening between its ends permitting inspection of said dial.

14. A weighing scale substantially as specified by claim 13, the said supporting structure and load-carrying means being provided with coöperating detents, one of which has a manually movable lever, and the said case being provided with a slot in which said lever is movable.

15. A registering weighing scale comprising load-carrying means, a supporting structure for said means, yielding resistance means supported by said structure and yieldingly supporting the load-carrying means, a pointer-carrying arbor journaled in a fixed bearing on the supporting structure, a fixed central dial concentric with said arbor, a rotatable annular dial concentric with the fixed dial, torque-transmitting connections between the load-carrying means and said arbor and annular dial, operable by the depression of the load-carrying means, to cause the pointer to register separate weighings on the fixed dial up to a predetermined limit, and to cause the annular dial to register the result of a series of separate weighings, means being provided for permitting forward rotation of the annular dial and preventing its backward rotation, manually operable means for rotating the annular dial to set it at zero, said means including a key-operated arbor, and an inclosing case supported by the supporting structure, and provided with a sight opening through which said dials are visible, a mark coöperating with the annular dial, and an orifice for the reception of a key applied to said arbor.

16. A registering weighing scale comprising load-carrying means, a supporting structure for said means, yielding resistance means supported by said structure and yieldingly supporting the load-carrying means, a pointer-carrying arbor journaled in a fixed bearing on the supporting structure, a fixed central dial concentric with said arbor, a rotatable annular dial concentric with the fixed dial, torque-transmitting connections between the load-carrying means and said arbor and annular dial, operable by the depression of the load-carrying means, to cause the pointer to register separate weighings on the fixed dial up to a predetermined limit, and to cause the annular dial to register the result of a series of separate weighings, means being provided for permitting forward rotation of the annular dial and preventing its backward rotation, manually operable means for rotating the annular dial to set it at zero, said means including a key-operated arbor, and an inclosing case supported by the supporting structure, and provided with a sight opening through which said dials are visible, a mark coöperating with the annular dial, and an orifice for the reception of a key applied to said arbor, means being provided for locking said manually movable member in its operative position.

In testimony whereof I have affixed my signature.

HOSEA HATHAWAY.